(12) United States Patent
Ueda et al.

(10) Patent No.: US 8,210,645 B2
(45) Date of Patent: Jul. 3, 2012

(54) IMAGE FORMING APPARATUS

(75) Inventors: Masashi Ueda, Nagoya (JP); Hirotoshi Maehira, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 225 days.

(21) Appl. No.: 12/241,792

(22) Filed: Sep. 30, 2008

(65) Prior Publication Data

US 2009/0085970 A1 Apr. 2, 2009

(30) Foreign Application Priority Data

Oct. 1, 2007 (JP) ................................ 2007-257054

(51) Int. Cl.
*B41J 2/165* (2006.01)

(52) U.S. Cl. ......................................................... 347/37
(58) Field of Classification Search ........................ None
See application file for complete search history.

(56) References Cited

U.S. PATENT DOCUMENTS

| | | | | |
|---|---|---|---|---|
| 5,988,790 A * | 11/1999 | Koike et al. | ..................... | 347/41 |
| 6,012,797 A | 1/2000 | Iwata et al. | | |
| 6,069,709 A | 5/2000 | Harrington | | |
| 6,318,832 B1 * | 11/2001 | Bates et al. | ..................... | 347/15 |
| 6,607,317 B2 | 8/2003 | Morozumi | | |
| 7,907,306 B2 | 3/2011 | Yamazaki | | |
| 2002/0054305 A1 | 5/2002 | Ogasahara | | |
| 2005/0219650 A1 | 10/2005 | Kondo et al. | | |
| 2006/0262329 A1 | 11/2006 | Fujimori | | |

(Continued)

FOREIGN PATENT DOCUMENTS

EP 0076948 4/1983

(Continued)

OTHER PUBLICATIONS

JP Notice of Reasons for Rejection in JP 2007-257054, dated Aug. 4, 2009, (corresponding JP case), translated.

(Continued)

*Primary Examiner* — Matthew Luu
*Assistant Examiner* — Alejandro Valencia
(74) *Attorney, Agent, or Firm* — Banner & Witcoff, Ltd.

(57) ABSTRACT

An image forming apparatus includes a recording head including a plurality of printing elements each of which off-sets at least in a auxiliary-scanning direction one another and ejects droplets toward a recording medium. The image forming apparatus further includes a main scanning unit configured to scan the recording head, relative to the recording medium, in a main scanning direction perpendicular to the auxiliary-scanning direction. The image forming apparatus still further includes a auxiliary-scanning unit configured to scan the recording head, relative to the recording medium, in a main scanning direction perpendicular to the auxiliary-scanning direction. The image forming apparatus still yet further includes a controller configured to control the printing head, the main scanning unit and the auxiliary-scanning unit to form dots in rows arranged in the auxiliary-scanning direction at a first predetermined interval, and columns arranged in the main scanning direction at a second predetermined interval while performing main scans and sub-scans repeatedly. The controller controls the printing head, the main scanning unit and the auxiliary-scanning unit to form first dots in an area of the printing medium at first alternate columns by a first main scan, and to form second dots in the area by a second main scan at second alternate columns different from the first alternate columns. The second dots are shifted, relative to the first dots, a first predetermined distance smaller the first predetermined interval.

8 Claims, 6 Drawing Sheets

U.S. PATENT DOCUMENTS

| | | |
|---|---|---|
| 2007/0165073 A1 | 7/2007 | Nunokawa |
| 2008/0001980 A1 | 1/2008 | Maehira |

FOREIGN PATENT DOCUMENTS

| | | |
|---|---|---|
| EP | 0430451 | 6/1991 |
| EP | 0507328 A | 10/1992 |
| EP | 0518670 A | 12/1992 |
| EP | 0723872 | 7/1996 |
| EP | 0978387 | 2/2000 |
| EP | 1330113 | 7/2003 |
| EP | 1398157 | 3/2004 |
| EP | 1479519 A | 11/2004 |
| JP | 61120578 | 6/1986 |
| JP | 62005771 | 1/1987 |
| JP | 5057965 | 3/1993 |
| JP | 06024003 | 2/1994 |
| JP | 6233375 | 8/1994 |
| JP | 11078100 | 3/1999 |
| JP | 2002144637 | 5/2002 |
| JP | 2002210942 | 7/2002 |
| JP | 2003305830 | 10/2003 |
| JP | 2004034720 | 2/2004 |
| JP | 2005199609 | 7/2005 |
| JP | 2005254574 | 9/2005 |
| JP | 2006076219 | 3/2006 |
| JP | 2006088427 | 4/2006 |
| JP | 2006186755 | 7/2006 |
| JP | 2006240043 | 9/2006 |
| JP | 2008006689 | 1/2008 |
| WO | 2006013764 | 2/2006 |

OTHER PUBLICATIONS

EP Appln. No. 08253190.6-1522; European Search Report dated Dec. 30, 2008.
Notice of Reasons for Rejection in JP Application No. 2007-257850.
Robert Ulichney: "Digital Halftoning" 1987, MIT Press, London, England, XP002520218, pp. 239-240.
EP Search Report, Applications 08253175.7, dated Apr. 1, 2009.
Office Action, dated Aug. 18, 2011, in U.S. Appl. No. 12/241,732.

* cited by examiner

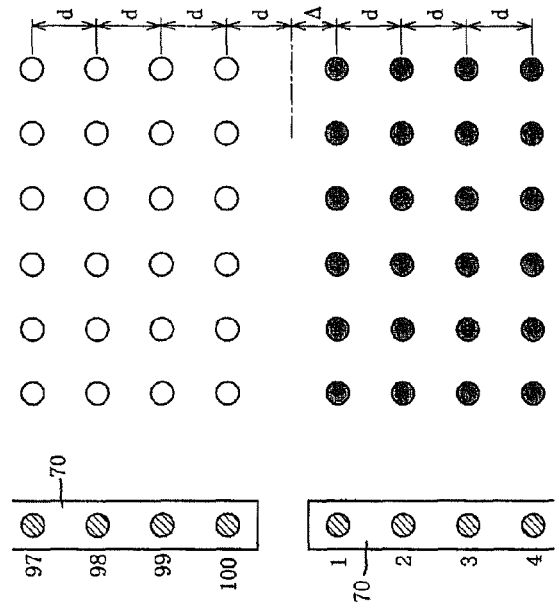
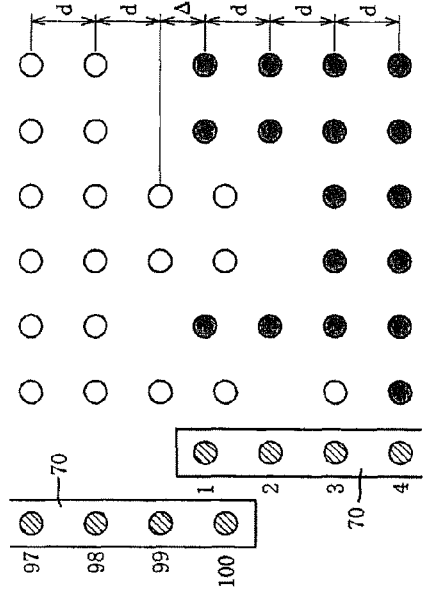
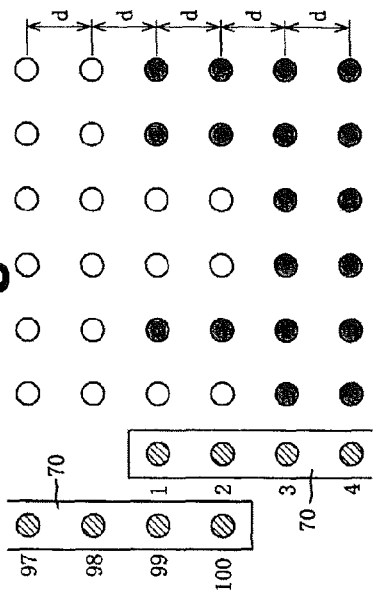
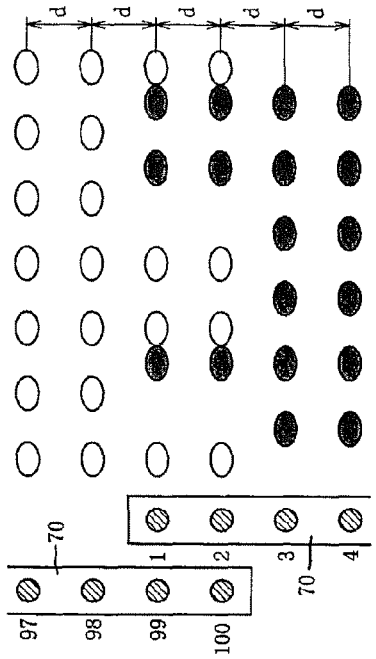

IMAGE FORMING APPARATUS

CROSS REFERENCE TO RELATED APPLICATION

This application claims priority from Japanese Patent Application No. 2007-257054 filed on Oct. 1, 2007, the entire subject matter of which is incorporated herein by reference.

BACKGROUND

1. Technical Field

Features described herein relate to an image forming apparatus for forming an image on a printing medium.

2. Related Art

A color ink-jet printer is known as an imaging forming apparatus. In this printer, ink droplets are ejected sequentially to a printing medium while an ink head for ejecting plural ink droplets is moved in the main scanning direction. After a scan in the main scanning direction has finished, an auxiliary scan is performed by, for example, moving the printing medium in a direction that crosses (e.g., is perpendicular to) the main scanning direction and then a main scan is performed again.

In the ink head, discharge apertures (printing elements) for ejecting plural ink droplets are arranged in the auxiliary-scanning direction. From a main scan, these apertures eject ink droplets onto a printing medium, forming rows of plural dots arranged in the main scanning direction (sometimes referred to as "rasters") When the printing medium is thereafter moved in the auxiliary-scanning direction by a ink head length, there may occur a phenomenon that the interval between the tail raster formed by the preceding main scan and the head raster formed by the current main scan becomes wider than the interval between rasters that are formed by one main scan due to, for example, an error of a feed mechanism for feeding the printing medium. In this case, white streaks occur which are called banding.

FIG. 6A shows example banding that occurs in the above manner. An ink head 70 is formed with 100 discharge apertures in the auxiliary-scanning direction. Dots indicated by white circles are formed by a main scan (preceding main scan) by the 97th to 100th discharge apertures of the ink head 70.

Then, after the printing medium has been transported in the auxiliary-scanning direction, dots indicated by black circles are formed by the 1st to 4th discharge apertures of the ink head 70. If the printing medium is transported by 101×d by the auxiliary scan (d: is the pitch of the discharge apertures of the ink-jet head 70), the interval between the tail raster formed by the preceding main scan and the head raster formed by the current main scan has a normal value. However, assume that the printing medium has been transported excessively (excess distance: Δ). In this case, the distance between the raster formed by the 100th discharge aperture in the preceding main scan and the raster formed by the 1st discharge aperture in the current main scan is equal to d+Δ. The raster interval there is wider than the other intervals d by Δ, which means banding.

In one known method for reducing the degree of such banding, as shown in FIG. 6B, the printing area of a preceding main scan and that of a current main scan overlap each other, so that for the rasters in the overlap area, some of the dots are printed by the preceding main scan, and the remaining dots are printed by the current main scan.

In the example of FIG. 6B, the rasters of the overlap area are formed by the 99th and 100th discharge apertures of the ink head 70 in the preceding main scan and by the 1st and 2nd discharge apertures of the ink head 70 in the current main scan.

FIG. 6C shows a case of the FIG. 6B technique, in which the printing medium was transported excessively (excess distance: Δ) in the auxiliary-scanning direction. Dots formed by the 1st discharge aperture of the ink head 70 are deviated downstream by Δ from dots formed by the 99th discharge aperture of the ink head 70, and dots formed by the 2nd discharge aperture of the ink head 70 are deviated downstream by Δ from dots formed by the 100th discharge aperture of the ink head 70. However, since the gaps caused by these deviations are not located on straight lines, they are less noticeable, and the degree of banding can be reduced.

However, in the technique discussed above, one raster is printed by plural main scans in an overlap printing area. Therefore, if an error occurs between a preceding main scan and a current main scan, dots formed by the preceding main scan and dots formed by the current main scan may overlap with each other. Such overlapping dots may be more noticeable to the human eye, and is unacceptable in view of increasing demand for higher print accuracy. Improving print accuracy is also hampered by the increasing demand for higher print speeds. As the movement speed in the main scanning direction is increased, the shape of the dots formed becomes less of a circle and more like an ellipse that is long in the main scanning direction.

As the printing speed is increased, the time interval between dot formation by a preceding main scan and that by a current main scan (i.e., the time from landing of ink droplets onto a printing sheet in the preceding main scan to landing of ink droplets in the current main scan) becomes shorter, and the current ink droplets land before the preceding ink droplets dry.

Therefore, if a deviation occurs in the main scanning direction, dots formed by the preceding main scan and dots formed by the current main scan may overlap with each other. When a dot of the current main scan is superimposed on a dot of the preceding main scan before the latter dries, then the two dots are combined into a single dot having a larger diameter, resulting in a deterioration in dot graininess.

FIG. 6D shows how elliptical dots formed by a preceding main scan and elliptical dots formed by a current main scan are connected to each other. If dots are connected to each other in this manner, small dots are particularly deteriorated in graininess when combined into larger dots. This means a problem that a rough, grainy image is formed instead of an intended high-resolution image.

SUMMARY

A need has arisen to provide an image forming apparatus capable of reducing the degree of banding or preventing deterioration in dot graininess.

In some embodiments, a printer may include a recording head configured to form a pattern on a recording medium; a main scanning unit configured to change a relative position between the recording head and the recording medium in a main scanning direction perpendicular to the auxiliary-scanning direction; an auxiliary-scanning unit configured to change a relative position between the recording head and the recording medium in the auxiliary-scanning direction; and a processing unit configured to control the printing head, the main scanning unit and the auxiliary-scanning unit to form rows of dots extending in the main-scanning direction and columns of dots extending in the auxiliary-scanning direction using a plurality of partially overlapping main scans, wherein in a non-overlapping area, adjacent rows and columns of dots are at uniform grid locations, and in an overlapping area, adjacent rows are offset, in the auxiliary-scanning direction, by a distance smaller than a distance between adjacent columns, wherein dots in adjacent rows appear in alternating columns, and dots in adjacent columns appear in alternating rows.

In the overlapping area, adjacent rows may be offset, in the auxiliary-scanning direction, by half the distance between adjacent columns The change in relative position can be accomplished by, for example, moving the recording head and/or recording medium, and the overlapping scans may include three or more scans.

In some embodiments, the dots (or dot positions) may be in a grid pattern, and may include more than one dot, separated by a predetermined distance.

BRIEF DESCRIPTION OF THE DRAWINGS

Illustrative aspects of the features will be described in detail with reference to the following figures wherein:

FIG. 2A shows an arrangement of dots that are formed normally and FIG. 2B shows an arrangement of dots that are formed when an error has occurred in an auxiliary scan;

FIGS. 6A-6D are schematic diagrams showing dot arrangements of conventional techniques; FIG. 6A shows a state in which banding has occurred due to an error in the transport direction, FIG. 6B is a dot arrangement diagram illustrating a conventional method for reducing the degree of banding, FIG. 6C shows how the degree of banding is reduced when an error occurs in the transport direction, and FIG. 6D shows a problem of the conventional method for reducing the degree of banding.

DETAILED DESCRIPTION

Features herein will be described in detail with reference to the accompanying drawings.

Figure 1:
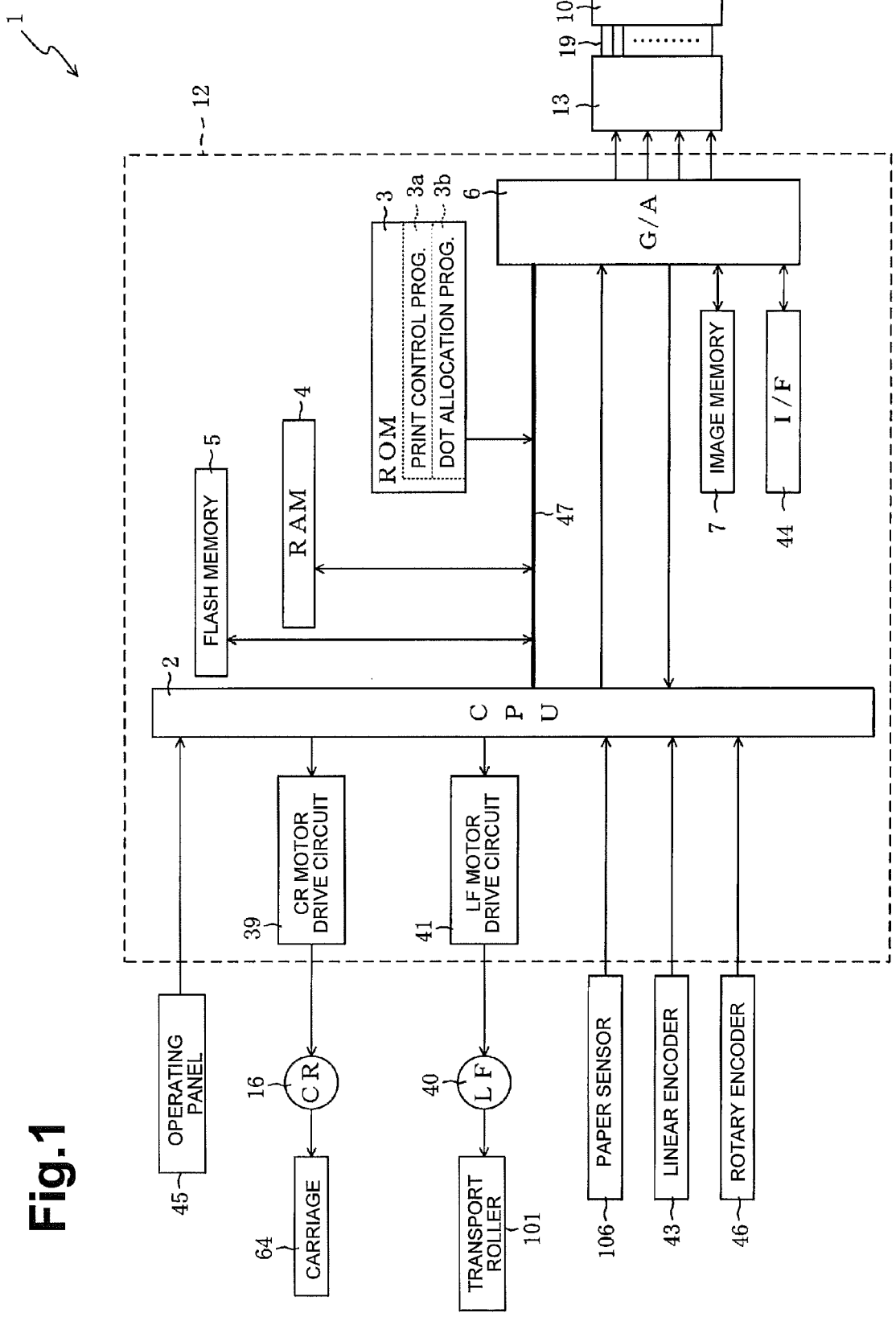
FIG. 1 is a block diagram schematically showing the electrical configuration of a printer as an image forming apparatus according to an embodiment described herein.

A printer 1 as an example image forming apparatus according to an embodiment will be hereinafter described with reference the accompanying drawings. FIG. 1 is a block diagram schematically showing the electrical circuit configuration of the printer 1. The printer 1 may be an ink-jet printer, which forms a color image by ejecting inks of plural colors to a printing medium (e.g, paper).

A controller for controlling the printer 1 is equipped with a main-body-side control board 12 and a carriage board 13. The main-body-side control board 12 may be mounted with a central processing unit (CPU) 2, a read-only memory (ROM) 3 in which various control programs to be run by the CPU 2 and fixed value data are stored, a random access memory (RAM) 4 which may be a memory for storing various data etc. temporarily, a flash memory 5, an image memory 7, a gate array (G/A) 6, etc. These various storage components may be one or more computer-readable media, storing control programs and computer-executable instructions for performing the steps described herein.

The CPU 2 as a computing device processes input image data according to a print control program 3a that may be stored in the ROM 3 in advance, and may store resulting image data in the image memory 7. The CPU 2 may also generate a print timing signal etc. and transfers individual signals to the gate array 6 (described later). The CPU 2 may also be connected to, and control, a variety of other components, such as an operating panel 45 through which a user makes a print instruction etc., a carriage return (CR) motor drive circuit 39 for driving a carriage motor (CR motor) 16 for moving a carriage 64 mounted with an ink head 109 in a main scanning direction which crosses (is perpendicular to) a auxiliary-scanning direction, a line feed (LF) motor drive circuit 41 for driving a transport motor (LF motor) 40 for driving a transport roller 101 which transports a printing medium in the auxiliary-scanning direction, a paper sensor 106, a linear encoder 43, and a rotary encoder 46.

Various data are temporarily stored in the RAM 4 when the CPU 2 runs the print control program 3a. The paper sensor 106 is a sensor for detecting presence/absence of a printing sheet. The linear encoder 43 is a device for detecting a movement distance of the carriage 64. The reciprocation movement of the carriage 64 in the main scanning direction is controlled according to the movement distance detected by the linear encoder 43. The rotary encoder 46 is a device for detecting a rotation angle of the transport roller 101. The transport roller 101 is controlled according to the rotation angle detected by the rotary encoder 46.

A print control program 3a for performing print processing, a dot allocation program 3b for performing processing of allocating dot positions to reduce the degree of banding, and other programs may be stored in the ROM 3. Correction values to be used for transporting a printing sheet correctly and scanning the ink head 109 correctly and other values may be determined by a pre-shipment test and stored in the flash memory 5. The CPU 2, the ROM 3, the RAM 4, the flash memory 5, and the gate array 6 are connected to each other via a bus line 47.

The gate array 6 transfers print data (drive signals) for printing, on a printing sheet, of image data stored in the image memory 7 and such signals as a transfer clock that are synchronized with the print data to the carriage board 13 on the basis of a timing signal transferred from the CPU 2 and the image data stored in the image memory 7. Furthermore, the gate array 6 stores, in the image memory 7, image data that is transferred from a personal computer, a digital camera, or the like via an interface (I/F) 44 such as a universal serial bus (USB) interface.

The carriage board 13 serves to apply voltages to piezoelectric actuators of the ink head 109. As a result of this action, ink droplets are ejected from the ink head 109 toward a printing medium.

Figure 2A:
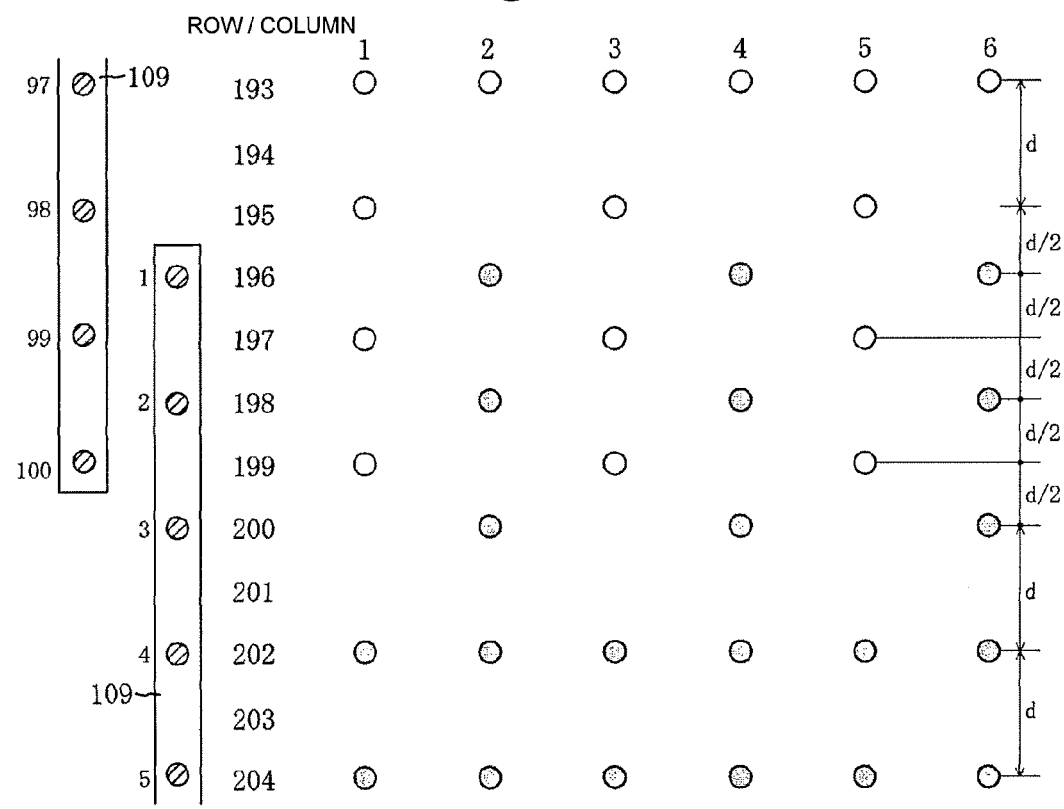
FIGS. 2A and 2B are schematic diagrams showing arrangements of dots formed on a printing medium.
Figure 2B:
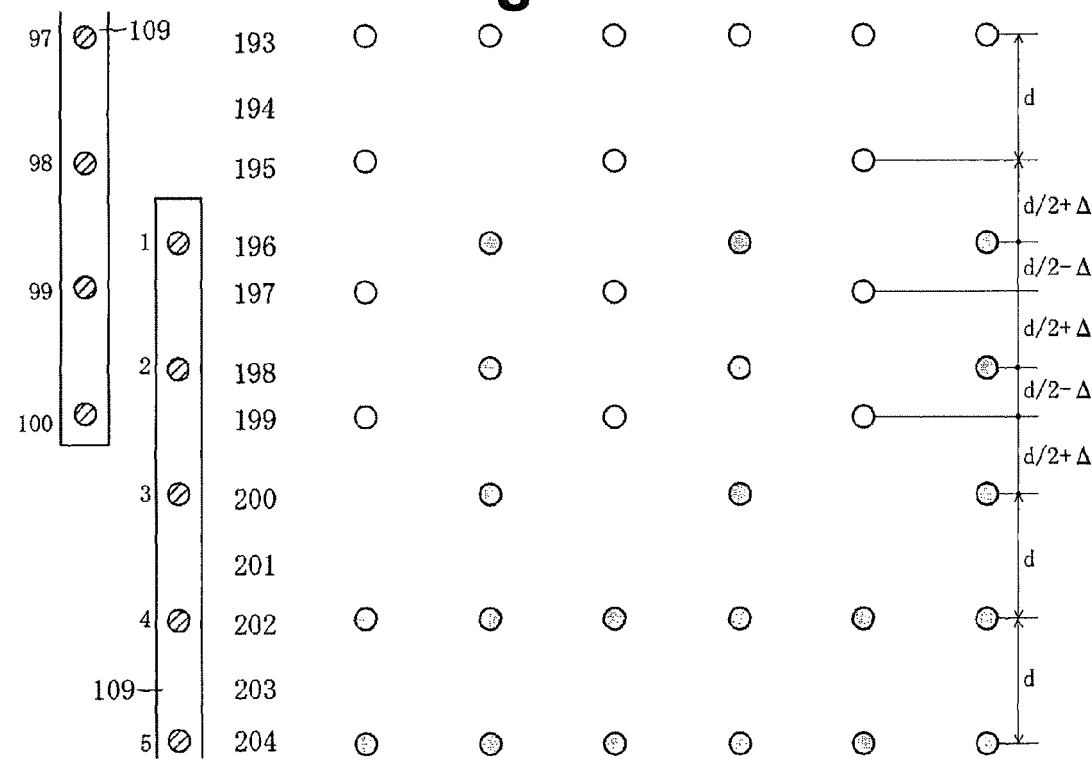

Next, an arrangement of dots (or dots at dot positions) that are formed on a printing sheet by the printer 1 will be described with reference to FIGS. 2A and 2B. Like FIGS. 6A-6D, FIGS. 2A and 2B are schematic diagrams showing ink-ejecting discharge apertures of the ink head 109 and arrangements of dots that are formed on a printing medium by the discharge apertures. In this example, the ink head 109 is formed with a print height having 100 discharge apertures (indicated by hatched circles) in the auxiliary-scanning direction. The illustrated discharge apertures are assigned numbers 1 to 100 (the head discharge aperture is given the number 1).

Dots formed on a printing sheet by a preceding main scan are indicated by white circles, and dots formed on the printing sheet by a current main scan are indicated by black circles.

Dots are located at lattice positions, arranged at equal positions vertically (in FIG. 2A, along the auxiliary-scanning direction) in columns, and horizontally (in FIG. 2A, along the main-scanning direction) in rows, or rasters. As illustrated, the columns are assigned columns numbers 1, 2, . . . from the left end of a page and, likewise, the rows are assigned row numbers 1, 2, . . . from the head of the page.

In part of an area on a printing sheet where printing was performed by a preceding main scan, rasters are formed by a current main scan at different rows from the positions of the rasters formed by the preceding main scan, whereby that part of the area is given a high resolution. In other areas, printing is performed at a low resolution. An example printing method is as follows. In a preceding main scan, rasters are formed at alternate row positions. In the next main scan (the current main scan), in an area where printing should be performed at the high resolution, rasters are formed at rows that are located between the rows of the rasters that were formed by the preceding main scan. As a result, the resolution in the auxiliary-scanning direction in the high-resolution area is two times that in non-overlap areas.

In FIGS. 2A and 2B, dots that are formed by a preceding main scan performed in a head portion of a page, and dots that are formed by the next main scan (current main scan) are shown aligned with the discharge apertures of the ink head 109 at the time the dots were formed.

FIG. 2A shows a dot arrangement that is formed when no transport error has occurred in the auxiliary-scanning direction. FIG. 2B shows a dot arrangement that is formed when a transport error Δ has occurred in the auxiliary-scanning direction.

As shown in FIG. 2A, in the preceding main scan, dots are formed at each column (1st column, 2nd column, 3rd column, . . . ) at the 193rd row by the 97th discharge aperture. Although omitted in FIG. 2A, the odd-numbered rows from the $1^{st}$ to the $191^{st}$ rows also have the same dot positions as row 193.

Dots are formed at the odd-numbered columns (1st column, 3rd column, 5th column, . . . ) at the 195th, 197th, and 199th rows by the 98th, 99th, and 100th discharge apertures. The interval between these rows is equal to d.

Then, in the current main scan, dots are formed at the even numbered columns (2nd column, 4th column, 6th column, . . . ) are formed at the 196th, 198th, and 200th rows by the 1st, 2nd, and 3rd discharge apertures, respectively.

In this manner, the dots are arranged in checkered form in the high-resolution area, and the interval between the rasters formed in the area from the 195th row to the 200th row is equal to a half (d/2) of the interval d between the rasters formed in the area from the 1st row to the 195th row.

Therefore, a subset of the rasters formed by the current main scan are formed in an area in which other rasters were formed by the preceding main scan. Accordingly, in those areas, the resolution in the auxiliary-scanning direction becomes two times higher than that of other areas. Even if a transport error occurs, the raster interval does not exceed d, and hence the degree of banding can be reduced. Furthermore, even if an error occurs in the main scanning direction, dots are formed in a different position in the auxiliary-scanning direction by the current main scan than by the preceding main scan and hence dots are less prone to overlap with each other. This can prevent deterioration of the dot graininess.

FIG. 2B shows dots that are formed when a printing sheet was transported excessively (excess distance: Δ) in the auxiliary-scanning direction after a preceding main scan and then a current main scan was performed.

The interval between a raster formed at the 195th row (formed by the 98th discharge aperture in the preceding main scan) and a raster formed at the 196th row (formed by the 1st discharge aperture in the current main scan) becomes d/2+Δ, and the interval between a raster formed at the 197th row (formed by the 99th discharge aperture in the preceding main scan) and the raster formed at the 196th row (formed by the 1st discharge aperture in the current main scan) becomes d/2−Δ. Likewise, the interval between the raster formed at the 197th row (formed by the 99th discharge aperture in the preceding main scan) and a raster formed at the 198th row (formed by the 2nd discharge aperture in the current main scan) becomes d/2+Δ, and the interval between a raster formed at the 199th row (formed by the 100th discharge aperture in the preceding main scan) and the raster formed at the 198th row (formed by the 2nd discharge aperture in the current main scan) becomes d/2−Δ. In this manner, blank lines having a width d/2+Δ are formed when a deviation of Δ occurs in the auxiliary-scanning direction. However, since the width of the blank lines does not exceed d, the degree of banding can be reduced.

In addition to reducing the degree of banding and minimizing deterioration of the graininess due to overlap of dots, increasing the printing speed is required. As described above, the degree of banding is reduced by forming rasters by a current main scan in part of an area that was formed by a preceding main scan. The effect of reducing the degree of banding is higher as the resolution in the auxiliary-scanning is set higher in that part of the area. However, there is a problem that as the resolution is set higher, the number of main scans (passes) is increased and the printing speed is lowered.

Figure 3A:
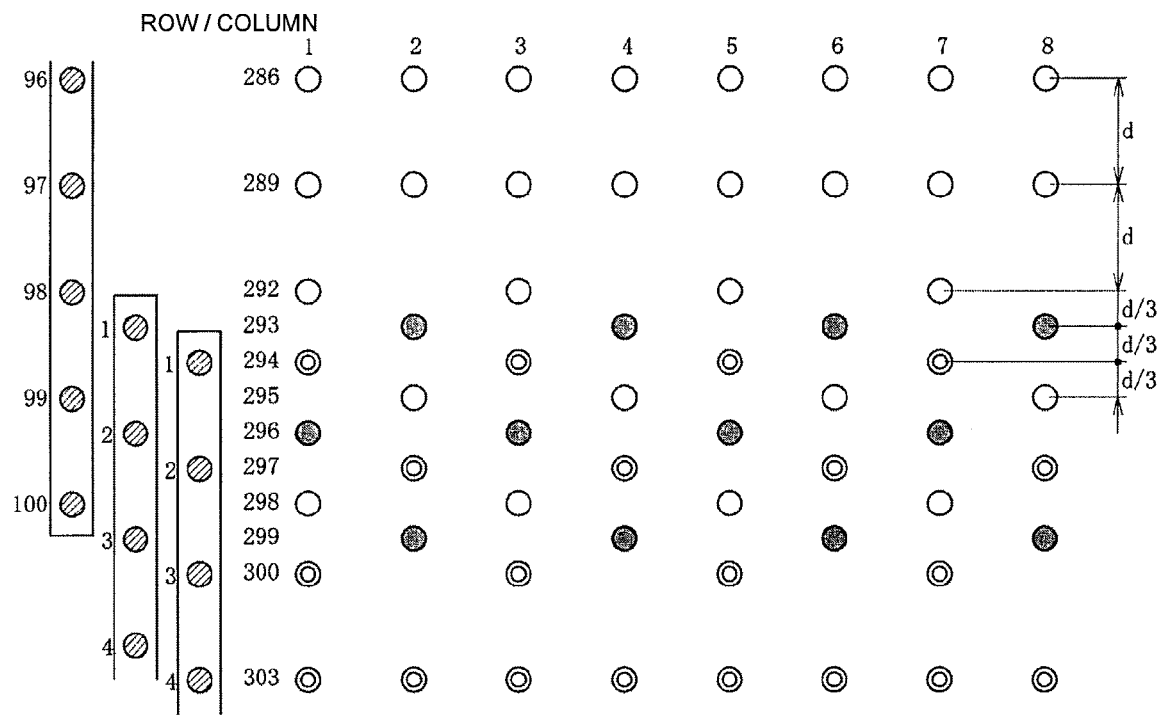
FIG. 3A is a schematic diagram showing a dot arrangement in a case that the number of passes is three.

FIG. 3A is a schematic diagram showing dots that are formed in a high-resolution area and its neighborhood in a case that the number of passes is three. As in the example of FIG. 2A, it is assumed that the ink head 109 is formed with 100 discharge apertures (indicated by hatched circles) in the auxiliary-scanning direction. The discharge apertures are assigned numbers 1 to 100 (the head discharge aperture is given the number 1). Dots formed on a printing sheet by a first main scan are indicated by white circles, dots formed by a second main scan are indicated by black circles, and dots formed by a third main scan are indicated by double circles.

As shown in FIG. 3A, the interval between rasters formed in the high-resolution area is ⅓ of the interval between rasters formed in non-overlap areas (the resolution is tripled). Therefore, rasters formed by one main scan are given row numbers that are separated from each other by three in order from the head of a page (e.g., 1, 4, 7, . . . ). With this notation, as shown in FIG. 3A, in the first main scan illustrated, a raster is formed at the 286th row by the 96th discharger aperture and a raster is formed at the 289th row by the 97th discharge aperture. In each of these rasters, dots are formed at all columns as needed by the image.

Rasters are also formed at the 292nd, 295th, and 298th rows by the 98th, 99th, and 100th discharge apertures, respectively, during that first main scan. However, in each of these rasters, dots are formed at alternate columns (e.g., row 292 has dots in the odd-numbered columns, while row 295 has dots in the even-numbered columns).

After the first main scan, the printing sheet is transported in the auxiliary-scanning direction. In this example, the ink head 109 is transported by (97+⅓) times the interval between the discharge apertures in the auxiliary-scanning direction. In the next main scan (second pass), rasters are formed at the 293rd, 296th, and 299th rows by the 1st, 2nd, and 3rd discharge apertures, respectively. In those rows, dots may be formed at alternating columns (e.g., row 293 has dots in the even-numbered columns, while row 296 has them in the odd-numbered columns), and alternating with those from the first pass (e.g. the first row in the first pass had dots on the odd-numbered columns, while the first row in the second pass had dots on the even-numbered columns).

Then, the printing sheet is transported by ⅓ times the interval between the discharge apertures in the auxiliary-scanning direction. In the next main scan (third pass), rasters are formed at the 294th, 297th, and 300th rows by the 1st, 2nd, and 3rd discharge apertures, respectively. As shown in FIG. 3A, in the area from the 292nd row to the 300th row, dots are also formed in checkered form (e.g., row 294 has dots in the odd-numbered columns, while row 297 has dots in the even-numbered columns).

In the example of FIG. 3A, the first transport is performed so that the 1st discharge aperture of the ink head 109 will be located at the 293rd row to begin the second pass. However, in the first transport, the ink head 109 may be transported to any position as long as the ink head 109 is allowed to form rasters at the 293rd row to the 299th row. Furthermore, in the example of FIG. 3A, dots are formed by the 1st to 3rd discharge apertures in the second main scan, but other apertures may be used instead. In the second main scan, the 4th to 100th discharge apertures may either form or not form dots.

Figure 3B:
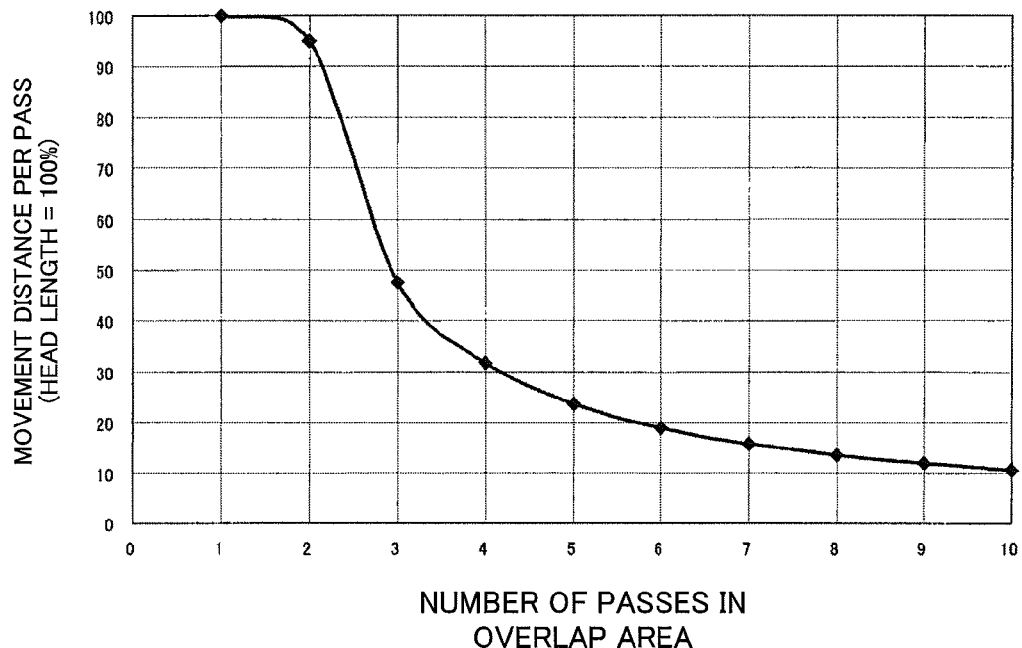
FIG. 3B is a graph showing a relationship between the number of passes and the movement distance per pass.

FIG. 3B is a graph showing a relationship between the printing speed and the resolution (number of passes) in a high-resolution area. In this graph, the horizontal axis represents the number of passes and the vertical axis represents the (average) movement distance per pass. The example ink head 109 is formed with 100 discharge apertures in the auxiliary-scanning direction, and the movement distance is expressed in the number of discharge apertures in the auxiliary-scanning direction. This graph corresponds to a case that a high-resolution area includes an area that is formed by the 96th to 100th discharge apertures in the first main scan (the high-resolution area ratio is 5%).

In a conventional printing operation in which no high-resolution areas are formed, the number of passes is one and for each path the ink head 109 is moved (actually, a printing sheet is moved) in the auxiliary-scanning direction by a distance corresponding to the 100 discharge apertures. Where the number of passes is two in the embodiment, as shown in FIG. 2A, in a high-resolution area, rasters are formed by a current main scan between rasters that were formed by a preceding main scan. In this case, for each pass, the ink head 109 is moved in the auxiliary-scanning direction by 95% of the head length.

Where the number of passes is three, in a high-resolution area, the section (length: d) between each adjoining pair of rasters that were formed by a first main scan is divided into three equal parts. In a second main scan, a raster is formed at a ⅓ position of the section. In a third main scan, a raster is formed at a ⅔ position of the section. In the example of FIG. 3A, the distance of the first auxiliary scan is 95% of the head length plus d/3 and that of the second auxiliary scan is d/3. Therefore, the average head movement distance is approximately equal to (95/2) % of the head length.

Likewise, where the number of passes is four, the average head movement distance is approximately equal to (95/3) % of the head length. That is, the movement distance per pass is given by $(N-M)/(P-1)$, where N is the number of discharge apertures of the ink head 109 which are arranged in the auxiliary-scanning direction, M is the number of discharge apertures corresponding to a high-resolution area among the N discharge apertures, and P is the number of passes.

As is apparent from this graph, setting the number of passes to three or more makes the movement distance per pass much shorter than in the case where the number of passes is two. A shorter movement distance per pass means a lower printing speed. Therefore, to maintain a higher printing speed, the number of passes is set small to enable high-speed printing and the resolution of a high-resolution area is set to two times that of a low-resolution area.

Next, a detailed dot arrangement in a case that the number of passes is two will be described with reference to FIG. 4. As described above, a transport error may occur when a printing sheet is transported in the auxiliary-scanning direction, and an error may occur in the main scanning direction when the ink head 109 is moved in the main scanning direction.

Factors that relate to an error in the dot landing position in the auxiliary-scanning direction include the accuracy of transport of a printing sheet in the auxiliary-scanning direction and the working accuracy that determines the interval between the discharge apertures in the auxiliary-scanning direction and the directions of the discharge apertures. On the other hand, factors that relate to an error in the dot landing position in the main scanning direction include the accuracy of reciprocation of the ink head 109, the working accuracy that determines the interval between the discharge apertures in the main scanning direction and the directions of the discharge apertures, and the timing and ejecting speed of the ink ejecting which is performed while the ink head 109 is moved. In particular, since ink droplets are ejected while the ink head 109 is moved at high speed, the shape of dots formed on a printing sheet tends to be an ellipse that is longer in the main scanning direction rather than a circle. Therefore, in an overlap printing area, dots tend to overlap with each other more in the main scanning direction than in the auxiliary-scanning direction.

Figure 4A:
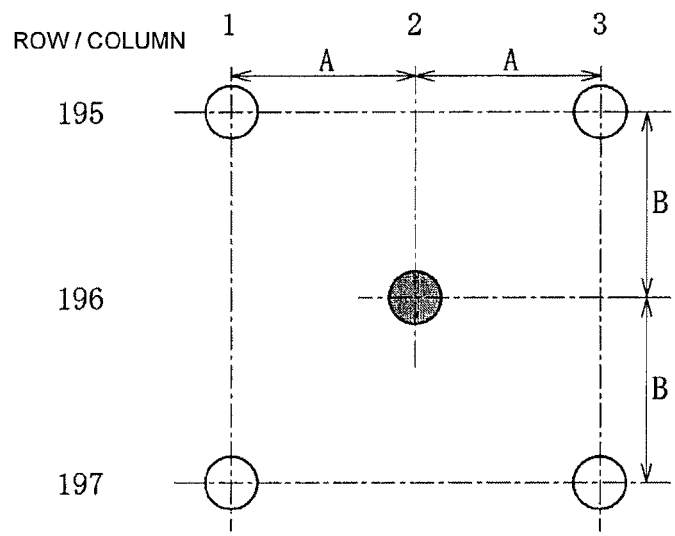
FIGS. 4A and 4B are schematic diagrams each showing a row interval and a column interval of dots that are formed in a high-resolution area.

FIG. 4A is a schematic diagram showing an arrangement of dots that are formed in a high-resolution area, such as in FIG. 2A. Dots that formed at the 1st and 3rd columns at the 195th and 197th rows by a preceding main scan and a dot formed at the 2nd column at the 196th row by a current main scan are shown. The interval between the columns is represented by A and the interval between the rows is represented by B.

As mentioned above, there are more factors that influence an error in the main scanning direction than factors that influence an error in the auxiliary-scanning direction. In the main scanning direction, since ink droplets are ejected while the ink head 109 is moved at high speed, the shape of dots formed on a printing sheet becomes an ellipse that is longer in the main scanning direction rather than a circle. In view of this, the interval A between the columns is set longer than the interval B between the rows. This makes it possible to lower the probability that dots that are formed by a current main scan overlap with dots that were formed by a preceding main scan. Since the interval between dots formed at each row is 2×A, the interval between dots formed in the main scanning direction can be set longer than two times the interval B between the rows in the auxiliary-scanning direction.

Figure 4B:
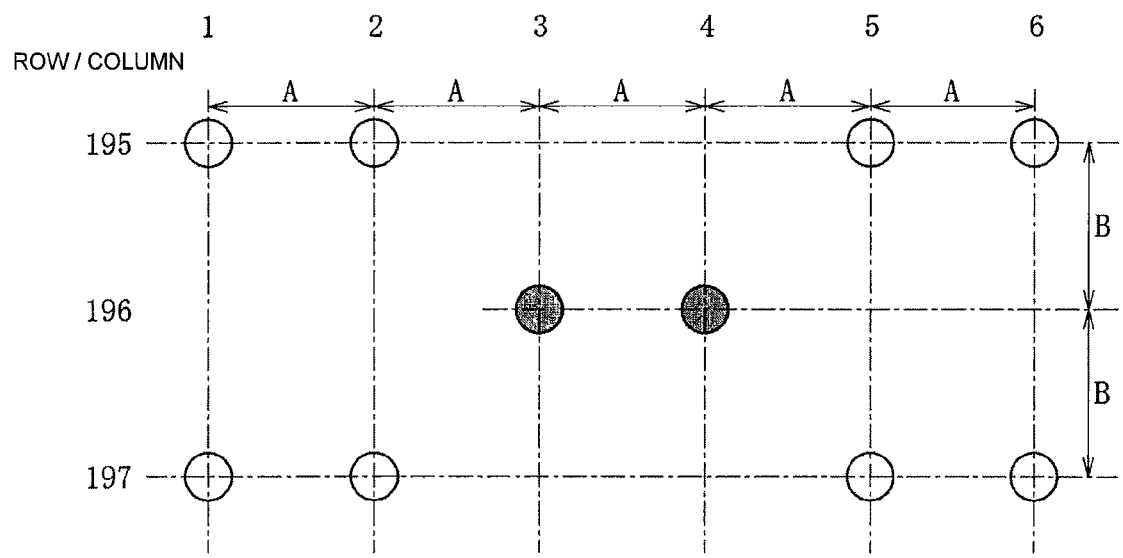

In the discussion above, the examples given show a single dot being formed at the various dot positions in the uniform grid pattern formed by the recording head in a main scan. The dot positions can, however, have more than one dot at each position. FIG. 4B is a schematic diagram showing another arrangement of dots that are formed in a high-resolution area. In the example of FIG. 4B, the row has two dots, then two blanks, then two dots, and so on. Stated differently, it is divided into sections each having two columns, and two dots are formed in every other section. At the next row, dot-forming sections and dot-non-forming sections are located at opposite positions to the positions at the one row. That is, dots are not formed in a section having a dot-forming section immediately above and dots are formed in a section having a dot-non-forming section immediately above. For example, at the 195th row, dots are formed at the 1st and 2nd columns, not formed at the 3rd and 4th columns, and formed at the 5th and 6th columns. At the next, 196th row, dots are not formed at the 1st and 2nd columns, formed at the 3rd and 4th columns, and not formed at the 5th and 6th columns. Likewise, at the 197th row, dots are formed at the 1st and 2nd columns, not formed at the 3rd and 4th columns, and formed at the 5th and 6th columns.

Even with this arrangement, dots are more prone to overlap with each other in the main scanning direction than in the auxiliary-scanning direction. Therefore, the column interval A can be set longer than the row interval B. The row interval B is controlled by a signal that is supplied to the LF motor drive circuit 41 which controls the LF motor 40. The column interval A is controlled by a signal that is supplied to the CR motor drive circuit 39 which controls the CR motor 16. These signals are supplied from the CPU 2.

Figure 5:
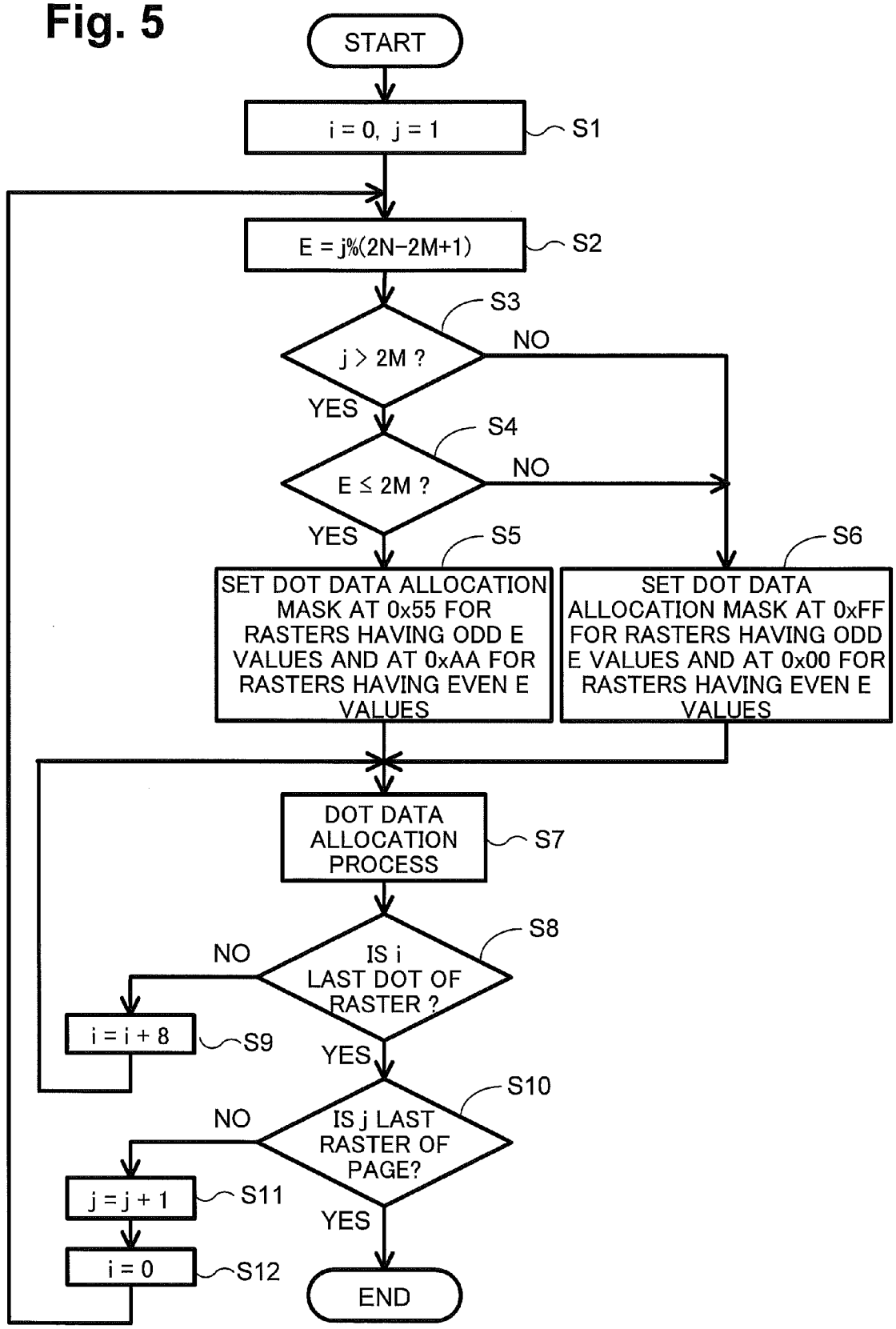
FIG. 5 is a flowchart of a dot allocation process.

Next, a dot allocation process that can be executed by the CPU 2 will be described with reference to FIG. 5. FIG. 5 is a flowchart of a dot allocation process for allocating dots in the arrangement form of FIG. 2A. In this dot allocation process, i is a variable that indicates a dot as an element of a raster, j is a variable that indicates a row (raster), N represents the number of discharge apertures of the ink head 109 which are arranged in the auxiliary-scanning direction, and M represents the number of discharge apertures for forming a high-resolution area among the N discharge apertures.

When a head portion of a printing sheet is subjected to a main scan, dots are formed at all the columns at the odd-numbered rows of the 1st to (2N−2M−1)th rows by the 1st to (N−M)th discharge apertures. And dots are formed at the even-numbered columns at the odd-numbered rows of the (2N−2M)th to (2N−1)th rows by the (N−M+1)th to Nth discharge apertures. Then, the printing sheet is transported by an auxiliary scan so that the 1st discharge aperture will be located at the (2N−2M+2)th row. Then, dots are formed at the odd-numbered columns at the even-numbered rows of the (2N−2M+2)th to 2Nth rows by the 1st to Mth discharge apertures. In this manner, a low-resolution area is formed from the 1st row to the (2N−2M)th row and a high-resolution area where dots are arranged in checkered form is formed from the (2N−2M)th row to the 2Nth row. Subsequently, an auxiliary scan and a main scan are performed repeatedly, whereby low-resolution areas and high-resolution areas are formed.

The dot allocation process is a process for sequentially allocating dot data at positions on a printing sheet that are indicated by pairs of a row and a column. First, at step S1, variable i which indicates a column is set at 0 and variable j which indicates a row (raster) is set at 1. At step S2, a remainder E of division of variable j by the auxiliary-scanning amount (2N−2M+1) is calculated ("%" is an operator of this operation). If it is judged at step S3 that variable j is larger than 2M (S3: yes), the row concerned does not belong to a high-resolution portion of the page. If it is judged at step S4 that the remainder E is smaller than or equal to 2M (S4: yes), the area concerned is a high-resolution area. At step S5, an allocation mask to be applied to 8-bit dot data of rasters whose remainders E are odd numbers is set at 0x55 ("0x" means a hexadecimal number; this also applies to the following description) and an allocation mask to be applied to 8-bit dot data of rasters whose remainders E are even numbers is set at 0xAA.

On the other hand, if variable j is smaller than or equal to 2M (S3: no), the row concerned belongs to a head portion of the page and hence printing should be performed at a low resolution. Also, if the remainder E is larger than 2M (S4: no), the row concerned belongs to an area where printing should be performed at the low resolution. Therefore, in these cases, at step S6 the allocation mask to be applied to 8-bit dot data of rasters whose remainders E are odd numbers is set at 0xFF and the allocation mask to be applied to 8-bit dot data of rasters whose remainders E are even numbers is set at 0x00.

When step S5 or S6 has been executed, at step S7 the 8-bit dot data is multiplied by the thus-set allocation masks and resulting dot data are stored in the image memory 7. At step S8, it is judged whether variable i indicates the last dot of the raster. If there remains an unprocessed dot(s) (S8: no), variable i is incremented by 8 at step S9 and the process returns to step S7 to read the next 8-bit data to be used for forming the raster. If variable i indicates the last dot of the raster (S8: yes), it is judged at step S10 whether variable j indicates the last raster of the page. If variable j does not indicate the last raster of the page (S10: no), variable j is incremented by 1 at step S11, variable i is set to 0 at step S12, and the process returns to step S2 to perform processing for the next row. If variable j indicates the last raster of the page (S10: yes), which means that processing for all rasters of the page has completed, the dot allocation process is finished.

As described above, in the embodiment, in an overlap area of an area that was formed by a preceding main scan and an area that is formed by a current main scan, dots formed by the current main scan are deviated from dots formed by the preceding main scan in the recording sheet transport direction (auxiliary-scanning direction) and the dots are arranged in checkered form as a whole. This makes it possible to reduce the degree of banding because no straight blank lines are formed even if an error occurs in the transport direction. Furthermore, there are more factors that influence an error in the main scanning direction than factors that influence an error in the auxiliary-scanning direction. Since dots are formed while the ink head 109 is moved in the main scanning direction, the dots assume an elliptical shape that is longer in the main scanning direction. Therefore, the probability that dots that are formed by a current main scan overlap with dots that were formed by a preceding main scan is higher in the main scanning direction than in the auxiliary-scanning direction. However, the dots are prevented from overlapping with each other because the column interval A is set longer than the row interval B. Therefore, the dot graininess is not deteriorated.

Although the features above have been described by means of the embodiment, this patent is not limited to the above embodiment, and various improvements and modifications are possible without departing from the spirit and scope of the disclosure herein.

For example, although the above embodiment is directed to the process of the printer 1, the embodiment can also be applied to a process of a multifunction peripheral apparatus, a facsimile apparatus, or the like.

Although in the above embodiment the printing medium on which printing is performed is a printing sheet (paper), the printing medium is not limited to paper and may be a cloth, a vinyl member, or the like.

In the examples of FIGS. 4A and 4B, in a high-resolution area, the line at each row is divided into equal sections each having a fixed number of (one or two) columns (e.g., equal numbers of blanks and dots within a row). Alternatively, the line at each row may be divided into sections having irregular numbers of columns in such a manner that, for example, dots are formed at two adjoining columns and dots are not formed at next three adjoining columns.

While the various aspects of the disclosure have been described in conjunction with the illustrative embodiments outlined above, various alternatives, modifications, variations, improvements and/or substantial equivalents may become apparent to those having at least ordinary skill in the art. Accordingly, the illustrative embodiments of the disclosure, as set forth above, are intended to be illustrative, not limiting. Various changes may be made without departing from the spirit and scope of the disclosure. Therefore, the disclosure is intended to embrace all known or later developed alternatives, modifications, variations, improvements and/or substantial equivalents.

What is claimed is:

1. An image forming apparatus comprising:
a recording head configured to form a pattern on a recording medium;
a main scanning unit configured to change a relative position between the recording head and the recording medium in a main scanning direction perpendicular to an auxiliary-scanning direction;
an auxiliary-scanning unit configured to change a relative position between the recording head and the recording medium in the auxiliary-scanning direction; and
a processing unit configured to control the printing head, the main scanning unit and the auxiliary-scanning unit to form rows of dots extending in the main-scanning direction and columns of dots extending in the auxiliary-scanning direction using a plurality of partially overlapping main scans, wherein, when there is no scanning error, in a non-overlapping area, adjacent rows and columns of dots are at uniform grid locations, and in an overlapping area, adjacent rows are offset, in the auxiliary-scanning direction, by a distance smaller than a distance between adjacent columns, wherein dots in adjacent rows appear in alternating columns, and dots in adjacent columns appear in alternating rows.

2. The image forming apparatus according to claim 1, wherein the auxiliary-scanning unit is configured to change the relative position between the recording head and the recording medium by transporting the recording medium in the auxiliary-scanning direction.

3. The image forming apparatus according to claim 1, wherein in the overlapping area, adjacent rows are offset, in the auxiliary-scanning direction, by half the distance between adjacent columns.

4. The image forming apparatus according to claim 1, wherein the plurality of partially overlapping main scans includes three partially overlapping main scans.

5. The image forming apparatus of claim 1, wherein in the overlapping area, the adjacent rows are offset, in the auxiliary-scanning direction, by a distance smaller than half of the distance between adjacent columns in the overlapping area.

6. The image forming apparatus of claim 5, wherein in the overlapping area, the adjacent rows are offset, in the auxiliary-scanning direction, by a distance that is a third of the distance between adjacent columns in the overlapping area.

7. The image forming apparatus of claim 1, wherein the processing unit is configured by design to create a uniform rectangular grid dot pattern in the non-overlapping area, and a non-grid dot pattern in the overlapping area, when there is no scanning error.

8. The image forming apparatus of claim 1, wherein the alternating columns and rows alternate between more than two column and row positions, respectively.

* * * * *